United States Patent
Fetzer et al.

(10) Patent No.: US 10,230,135 B2
(45) Date of Patent: Mar. 12, 2019

(54) CONNECTABLE BATTERY MODULE

(71) Applicants: Robert Bosch GmbH, Stuttgart (DE); Samsung SDI Co., Ltd., Yongin-si, Gyeonggi-do (KR)

(72) Inventors: Joachim Fetzer, Bad-Ditzenbach (DE); Sarmimala Hore, Stuttgart (DE); Hans Partes, Asperg (DE); Stefan Butzmann, Schalksmühle (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 250 days.

(21) Appl. No.: 14/769,725

(22) PCT Filed: Feb. 25, 2014

(86) PCT No.: PCT/EP2014/053568
§ 371 (c)(1),
(2) Date: Aug. 21, 2015

(87) PCT Pub. No.: WO2014/131738
PCT Pub. Date: Sep. 4, 2014

(65) Prior Publication Data
US 2016/0013520 A1    Jan. 14, 2016

(30) Foreign Application Priority Data
Feb. 27, 2013    (DE) .................. 10 2013 203 192

(51) Int. Cl.
*H01M 10/42*       (2006.01)
*H01M 10/6551*   (2014.01)
*H01M 10/6552*   (2014.01)
*H01M 10/0525*   (2010.01)
(Continued)

(52) U.S. Cl.
CPC ..... *H01M 10/4257* (2013.01); *B60L 11/1853* (2013.01); *B60L 11/1864* (2013.01);
(Continued)

(58) Field of Classification Search
CPC ................................ H01M 10/4257
See application file for complete search history.

(56) References Cited

U.S. PATENT DOCUMENTS 6,140,799 A * 10/2000 Thomasson ......... H01M 10/441
320/117
2004/0251858 A1 * 12/2004 Asao .................. H01M 10/613
318/139
(Continued)

FOREIGN PATENT DOCUMENTS

CN    1712259 A    12/2005
CN    102859829 A    1/2013
(Continued)

OTHER PUBLICATIONS

International Search Report corresponding to PCT Application No. PCT/EP2014/053568, dated May 9, 2014 (German and English language document) (5 pages).

*Primary Examiner* — Sarah A. Slifka
*Assistant Examiner* — Brian R Ohara
(74) *Attorney, Agent, or Firm* — Maginot, Moore & Beck LLP

(57) ABSTRACT

A battery module comprising a plurality of chambers of a first type, a chamber of a second type, a plurality of chambers of a third type, at least one battery unit positioned in one of the plurality of chambers of the first type, and switching electronics positioned in the chamber of the second type. At least one of the plurality of chambers of the third type is positioned between one of the plurality of chambers of the first type and the chamber of the second type.

16 Claims, 7 Drawing Sheets

(51) Int. Cl.
*B60L 11/18* (2006.01)
*H02J 7/00* (2006.01)

(52) U.S. Cl.
CPC ..... *H01M 10/425* (2013.01); *H01M 10/6551* (2015.04); *H01M 10/6552* (2015.04); *H02J 7/0042* (2013.01); *H01M 10/0525* (2013.01); *H01M 2220/20* (2013.01); *Y02E 60/122* (2013.01); *Y02T 10/7005* (2013.01); *Y02T 10/7061* (2013.01)

(56) References Cited

U.S. PATENT DOCUMENTS

| | | | | |
|---|---|---|---|---|
| 2005/0210662 A1* | 9/2005 | Li | ........................ | H01M 2/0262 29/730 |
| 2005/0285563 A1* | 12/2005 | Yoneda | ............... | H01M 10/613 320/112 |
| 2011/0183177 A1* | 7/2011 | Sohn | .................. | H01M 2/1077 429/120 |
| 2012/0299548 A1* | 11/2012 | Takahashi | ........... | H01M 2/1077 320/117 |
| 2014/0017528 A1* | 1/2014 | Uehara | ................. | H01M 2/202 429/61 |

FOREIGN PATENT DOCUMENTS

| | | | |
|---|---|---|---|
| DE | 10 2010 019 298 A1 | 1/2011 | |
| DE | 20 2011 003 345 U1 | 6/2011 | |
| DE | 10 2010 023 049 A1 | 12/2011 | |
| WO | 2011/128136 A1 | 10/2011 | |
| WO | WO-2012132134 A1 * | 10/2012 | ............ H01M 2/202 |

\* cited by examiner

CONNECTABLE BATTERY MODULE

This application is a 35 U.S.C. § 371 National Stage Application of PCT/EP2014/053568, filed on Feb. 25, 2014, which claims the benefit of priority to Serial No. DE 10 2013 203 192.0, filed on Feb. 27, 2013 in Germany, the disclosures of which are incorporated herein by reference in their entirety.

BACKGROUND

The disclosure relates to a connectable and disconnectable battery module, and to battery direct converters and battery direct inverters which comprise such a battery module.

DE 10 2010 023 049 A1 discloses a battery construction kit system comprising at least two battery units, which each have a switching unit and a diagnosis unit, which are flange-connected laterally to the battery units as a construction kit module. The switching and diagnosis units are connected to a superordinate battery control unit, which has the task of disconnecting in each case one battery unit for diagnosis and/or maintenance purposes.

DE 20 2011 003 345 U1 discloses an energy storage unit for providing electrical energy for a consumer which can be driven by electrical energy, which energy storage unit has a coupling region, with which the energy storage unit is connectable to a further second energy storage unit, with a substantially identical design, and an energy transmission region in order to enable an energy flow substantially from at least one of the energy storage units to the consumer.

DE 10 2010 019 298 A1 discloses a lithium-ion battery for electrically driven vehicles, which lithium-ion battery comprises a supply unit and a peak load energy store. The supply unit is configured to operate an electric motor in a base-load range, while the peak load energy store is configured to operate the electric motor in a peak load range.

SUMMARY

In embodiments, a battery module has chambers of a first type, a chamber of a second type and chambers of a third type, wherein at least one battery unit is accommodated in at least one chamber of the first type, switching electronics are accommodated in the chamber of the second type, and wherein at least one chamber of the third type is arranged between a chamber of the first type and the chamber of the second type.

Particularly advantageously, at least one chamber of the third type is arranged between the chambers of the first type accommodating the battery units and the chamber of the second type accommodating the switching electronics. As a result, a compact modular design of the battery system is achieved, which entails advantages in terms of maintenance of the battery system and promises free scalability of the system since the switching electronics and the battery module actuated by the switching electronics are accommodated in a common structure.

Particularly preferably, the chambers of the first, second and third type have identical dimensions. Although, therefore, switching electronics can be provided which take up substantially less space than the battery units, said switching electronics are arranged in a chamber which has identical dimensions to the chambers accommodating the battery unit. The third chamber, which spaces apart the first chamber from the second chamber, is introduced into the modular design well when it likewise has identical dimensions. This results in a block in the form of a right-parallelepiped which comprises the battery units and the switching electronics arranged spaced apart therefrom. A plurality of these right-parallelepipeds can now be stacked, for example in order to form a so-called battery direct converter (BDC).

In accordance with a preferred embodiment, at least one chamber of the third type is free. The free third cell performs the task of providing thermal insulation between the switching electronics and the battery units, as well as providing the compact modular design. The use of an empty chamber of the third type makes it possible to prevent direct dissipation of heat from the switching electronics into the battery cells.

However, provision can also be made for at least one chamber of the third type to have at least one cooling device. In this case, the cooling device both provides the function of thermal insulation of the battery units with respect to the switching electronics and additionally enables directional dissipation of heat which arises at the switching electronics. This makes it possible for the battery cells to be able to be kept at an optimum temperature, in particular during the winter months. Suitable cooling devices include, for example, coolant circulating in the chamber, meandering pipes for accommodating a circulating coolant, blowers, fans, heat pipes or so-called thermabases. Correspondingly, provision can be made for the chambers of the third type to have side walls with an inlet and an outlet for supplying and discharging coolant, with passages for heat pipes and/or side walls with perforations or cooling ribs.

If a plurality of chambers of the third type is provided, the cooling device is preferably arranged in that chamber which is closest to the switching electronics, i.e. the chamber of the third type with the cooling device adjoins the chamber of the second type and is designed to cool the switching electronics accommodated therein.

In accordance with one embodiment, a chamber of the third type can have a fan. The fan can likewise be used for thermal insulation of the battery units with respect to the switching electronics by virtue of hot air being dissipated away from the switching electronics and at the same time cooler air being supplied.

In accordance with a preferred embodiment, at least one side wall of the chamber of the second type has perforations and/or a ventilation grating and/or cooling ribs. The side wall is preferably that which adjoins the chamber of the third type with the cooling device, preferably a fan. The air flow from the fan can be guided in a particularly effective manner to the switching electronics through the openings.

In accordance with a further embodiment, the cooling device comprises at least one heat pipe. A heat pipe is, for example, a simple pipe which is closed at the ends, wherein a capillary material is provided in the interior between the ends. The heat pipe is filled with a quantity of evaporable liquid, for example with water. Such a low pressure prevails in the heat pipe that the liquid is in a state of equilibrium between the liquid state of aggregation and the gaseous state of aggregation and as a result evaporates on a warmer section of the heat pipe and condenses on a cooler section. As a result, very efficient heat transfer is provided. One end of the heat pipe is in this case in contact with the chamber of the second type in which the switching electronics are accommodated, and a further end of the heat pipe is in contact with a heat sink, for example with a fan, wherein said heat sink can be arranged in a chamber of the third type. The heat pipe can also end at a side wall of the chamber of the third type, which is not in contact with the switching electronics and the battery units, wherein this side wall can be in contact with a heat sink.

Alternatively, a side wall of the chamber of the third type can also be provided with a temperature compensation plate and adjoin the chamber of the second type with the switching electronics arranged therein. The temperature compensation plate therefore enables the transfer of heat away from the chamber with the switching electronics into the chamber of the third type, in which a blower is arranged, for example, and which has perforated side walls so that the exhaust air can escape. Such a temperature compensation plate can likewise function in accordance with the heat pipe principle, i.e. with a capillary material and a heat transfer medium, which is in a state of equilibrium between the liquid state of aggregation and the gaseous state of aggregation, wherein, geometrically, a plate and no pipe is present.

In accordance with a further embodiment, a first chamber of the third type is provided which adjoins the chamber of the second type and a further chamber of the third type. A heat pipe can transfer the heat away from the switching electronics via the first chamber of the third type to the further chamber of the third type, in which, for example, a fan for blowing out the exhaust air can be provided.

In accordance with one embodiment, each chamber of the first type is designed for accommodating precisely one battery unit. However, it is preferred for the battery units accommodated in the chamber of the first type to comprise a plurality of cells, wherein the cells can have a so-called coil or else a plurality of coils interconnected with one another.

In accordance with a further aspect, a battery direct converter comprises at least one, preferably a large number of the previously described battery modules. In accordance with a further aspect, a battery direct inverter comprises at least two such battery converters.

A modular design of connectable battery modules for use in battery direct inverters and battery direct converters is proposed by means of the measures of the disclosure, as a result of which free scalability of the system results. By arranging chambers which correspond substantially to the dimensions of the installed battery units and the chamber accommodating the switching electronics, in addition there is the possibility of effective dissipation of the heat produced at the switching electronics, which has effects on the life of the battery modules.

BRIEF DESCRIPTION OF THE DRAWINGS

Exemplary embodiments of the disclosure are illustrated in the drawings and will be explained in more detail in the description below.

In the drawings.

DETAILED DESCRIPTION

The terms "battery" and "battery system" are used in the present description, in line with conventional usage, to mean "rechargeable battery" and "rechargeable battery system", respectively. The described system can generally be used in systems which can be constructed in modular fashion, in particular in lithium-ion battery systems which are used as drive for electric vehicles and hybrid vehicles.

Figure 1:
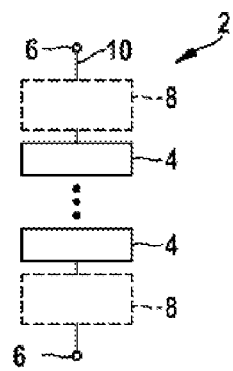
FIG. 1 shows a schematic illustration of a battery direct converter.

FIG. 1 shows an embodiment of a battery direct converter (BDC), which has a battery module string 2. The battery module string 2 has a plurality of battery modules 4, wherein each battery module 4 preferably contains the same number of battery cells with identical interconnections. In addition, charging and disconnection devices 8 can be provided at the poles 6 of the battery module string 2, for example for the case where safety regulations demand this. However, such disconnection devices 8 are not absolutely necessary because decoupling of the battery modules 4 can take place by coupling units (not illustrated here), i.e. switching electronics, contained in the battery modules 4. There is the possibility of the individual battery module 4 either being connected into or disconnected from the battery module string 2.

Figure 2:
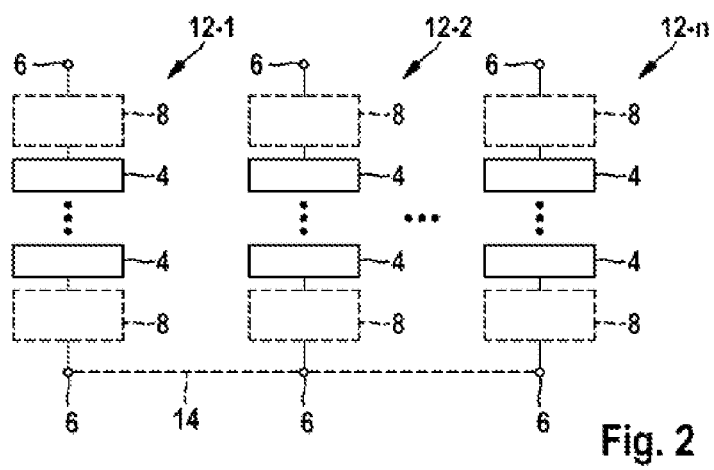
FIG. 2 shows a schematic illustration of a battery direct inverter.

FIG. 2 shows an embodiment of a battery direct inverter (BDI), which has n battery module strings 12-1 to 12-$n$. Each battery module string 12-1 to 12-$n$ has a plurality of battery modules 4, wherein preferably each battery module string 12-1 to 12-$n$ contains the same number of battery modules 4, and each battery module 4 preferably contains the same number of battery cells with identical interconnections. A pole 6 of each battery module string 12-1 to 12-$n$ can be connected to a corresponding pole 6 of the other battery module strings 12-1 to 12-$n$, which is indicated by a dashed line 14. Charging and disconnection devices 8 can be provided at the poles 6 of the battery module strings 12-1 to 12-$n$ if safety regulations require this. During operation as a battery direct inverter, virtually sinusoidal voltage profiles with a phase shift with respect to one another can be produced, as a result of which an electric motor can be fed the required torque. The voltage is preferably such that the generated alternating current provides the required torque for operating the electric motor.

Figure 3:
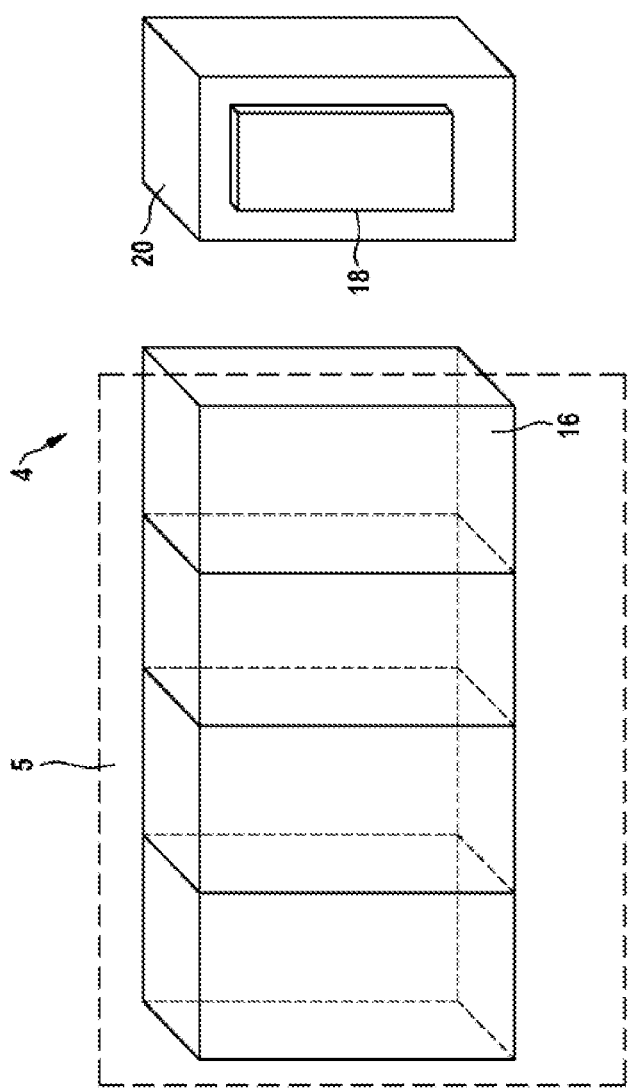
FIG. 3 shows a schematic illustration of a battery module comprising associated switching electronics.

FIG. 3 shows a battery module 4, which has four chambers 16 of a first type arranged next to one another and in which battery units (not illustrated) are located. The arrangement of the chambers 16 of the first type is provided with the reference symbol 5. In order to achieve the required power and energy data with the battery system, individual battery cells are connected in series and sometimes additionally in parallel in a battery unit. The battery cell is, for example, a lithium-ion battery with a voltage range of from 2.8 volts to 4.2 volts.

Also illustrated is switching electronics 18, which are designed to connect and disconnect the battery module 4 to or from one of the strings described with reference to FIG. 1 or 2, for example in order to prevent overworking of the battery module 4. The switching electronics 18 are arranged in a chamber 20 of a second type, which can have an identical design to the chambers 16 of the first type.

Figure 4:
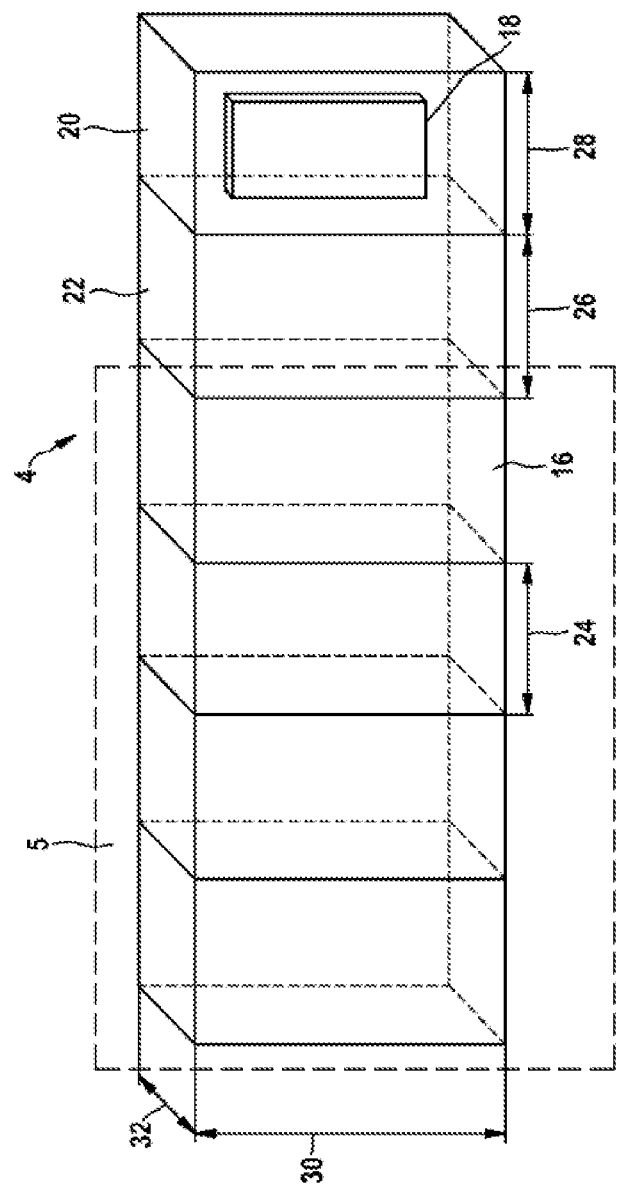
FIG. 4 shows a schematic illustration of a battery module in a first embodiment.

FIG. 4 shows a battery module 4 in accordance with a first embodiment. The battery module 4 comprises, by way of example, four chambers 16 of the first type arranged next to one another and a chamber 20 of the second type, which has the switching electronics for selectively connecting and disconnecting the battery module 4 to and from the battery direct converter illustrated in FIG. 1 or to and from the battery direct inverter illustrated in FIG. 2. In addition, the battery system comprises a chamber 22 of a third type, which is arranged between a chamber 16 of the first type and the chamber 20 of the second type. The chamber 22 of the third type illustrated in FIG. 4 is free, i.e. is filled with ambient air, for example. Provision can likewise be made for the chamber 22 of the third type to be filled with a thermally insulating material in order to prevent the waste heat from the switching electronics 18 reaching the battery cells.

The chamber 22 of the third type has a width 26, which is identical to the width 24 of the identically designed chambers 16 of the first type and which is also identical to the width 28 of the chamber 20 of the second type. The chambers 16, 22, 20 additionally have a uniform height 30 and a uniform depth 32, with the result that, overall, a completely modular design with visual homogeneity is provided. The battery module 4 comprising the various chambers 16, 22, 20 has overall the structure of a right-parallelepiped, which enables simple stacking one above the other in order to obtain a battery module string of a battery direct converter or a battery module direct inverter.

Figure 5:
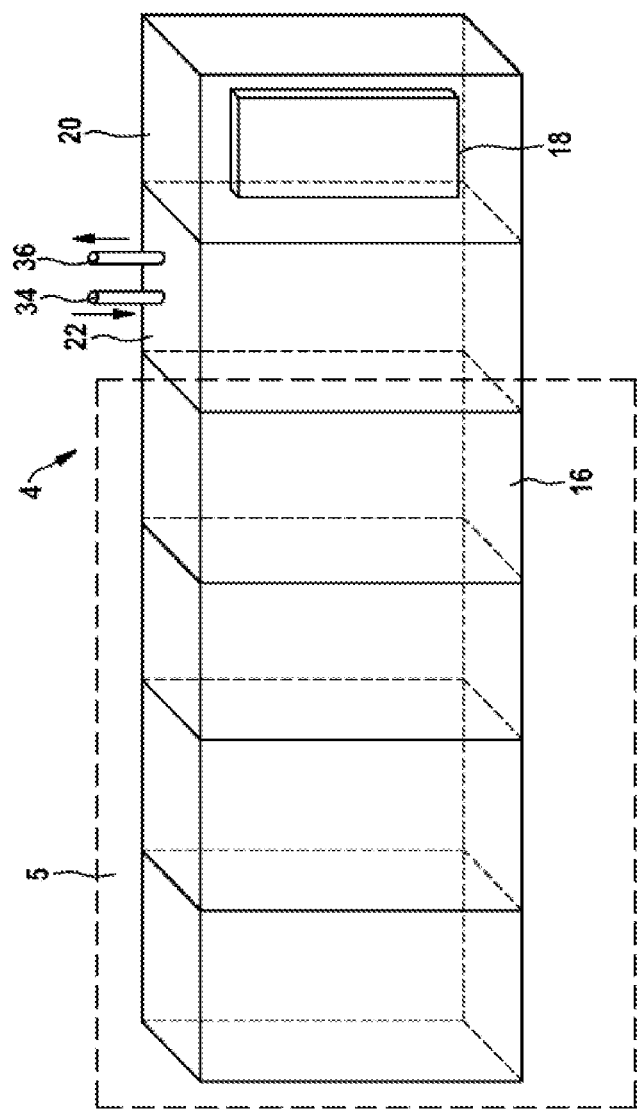
FIG. 5 shows a schematic illustration of a battery module in a second embodiment.

FIG. 5 shows a further embodiment of a battery module 4, which in this case comprises, by way of example, four chambers 16 of the first type arranged next to one another, a chamber 20 of the second type accommodating the switching electronics 18 and the chamber 22 of the third type. The dimensions of the chambers 16, 22, 20 can in particular be as described with reference to FIG. 4. The chamber 22 of the third type in this exemplary embodiment has an inlet 34 and an outlet 36, through which a cooling fluid can be passed into and out of the chamber 22 of the third type. The cooling fluid can be, for example, an ethylene glycol-water solution or propylene glycol-water solution or any desired suitable cooling fluid. Pipes can also be provided in the interior of the chamber 22 of the third type, through which pipes the cooling fluid is passed.

Figure 6:
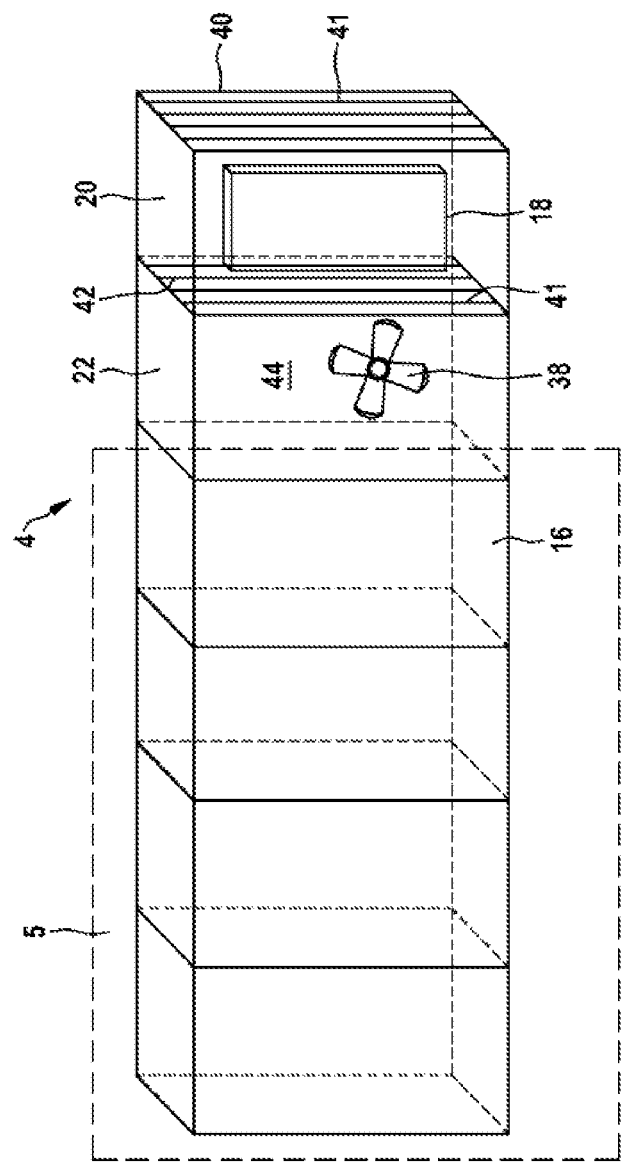
FIG. 6 shows a schematic illustration of a battery module in a third embodiment.

FIG. 6 shows a battery module 4 in accordance with a further embodiment having, by way of example, four chambers 16 of the first type arranged next to one another, an adjoining chamber 22 of the third type and a chamber 20 of the second type accommodating the switching electronics 18. The dimensions of the chambers 16, 22, 20 can be as described with reference to FIG. 4. A fan 38 is arranged in the chamber 22 of the third type, said fan being designed to dissipate the waste heat from the switching electronics 18. In the exemplary embodiment illustrated, cooling gratings 41 are provided for this purpose on a side wall 42 of the chamber 20 of second type, which adjoins the chamber 22 of the third type, said cooling gratings improving the heat transfer between the chambers 20, 22. Such cooling ribs 41 can also be arranged on the opposite side 40 of the chamber 20 of the second type in order to intensify the dissipation of heat from the switching electronics 18. The chamber 22 of the third type expediently has perforations or cooling gratings in one or more side walls 44, which do not adjoin the chambers 16 of the first type and do not adjoin the chamber 20 of the second type, as a result of which the air can be passed out of the chamber 22 of the third type from the fan 38.

Figure 7:
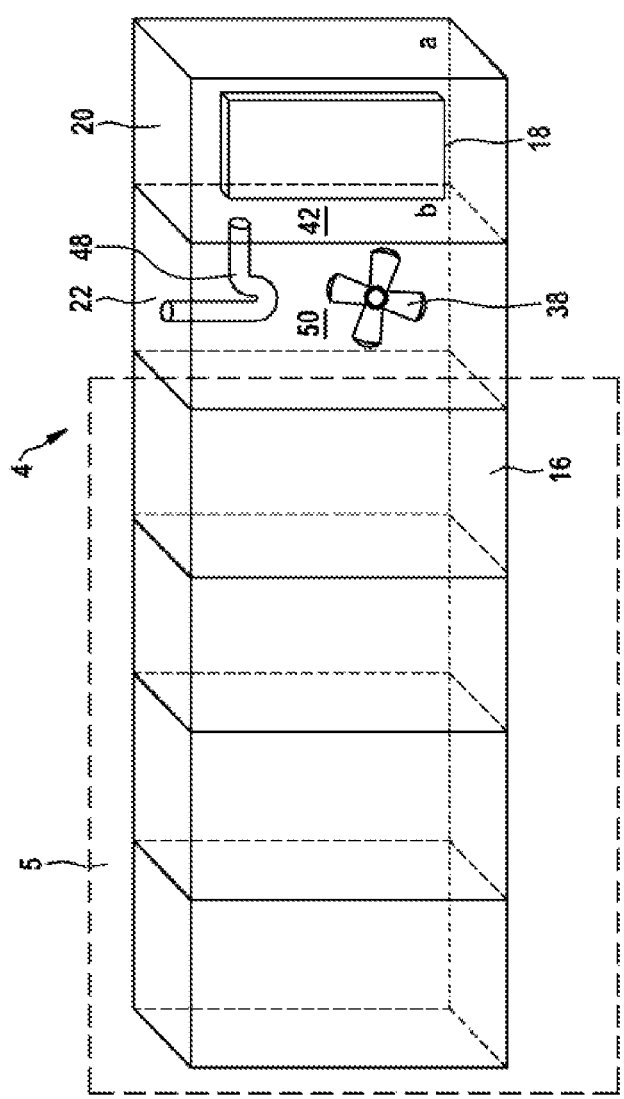
FIG. 7 shows a schematic illustration of a battery module in a fourth embodiment.

FIG. 7 shows a further exemplary embodiment of the battery module 4 according to the disclosure having four chambers 16 of the first type arranged next to one another, a chamber 20 of the second type comprising the switching electronics 18 and a chamber 22 of the third type, wherein the chamber 22 of the third type is arranged between a chamber 16 of the first type and the chamber 20 of the second type. The dimensions of the chambers 16, 20, 22 can be as described with reference to FIG. 4. In turn, a fan 38 is arranged in the chamber 22 of the third type. In addition, the chamber 22 of the third type has a heat pipe 48, which passes from the side wall 42 of the chamber 20 of the second type, which adjoins the chamber 22 of the third type, to a side wall 50 of the chamber 22 of the third type, which does not adjoin a chamber 16 of the first type and does not adjoin a chamber 20 of the second type.

Figure 8:
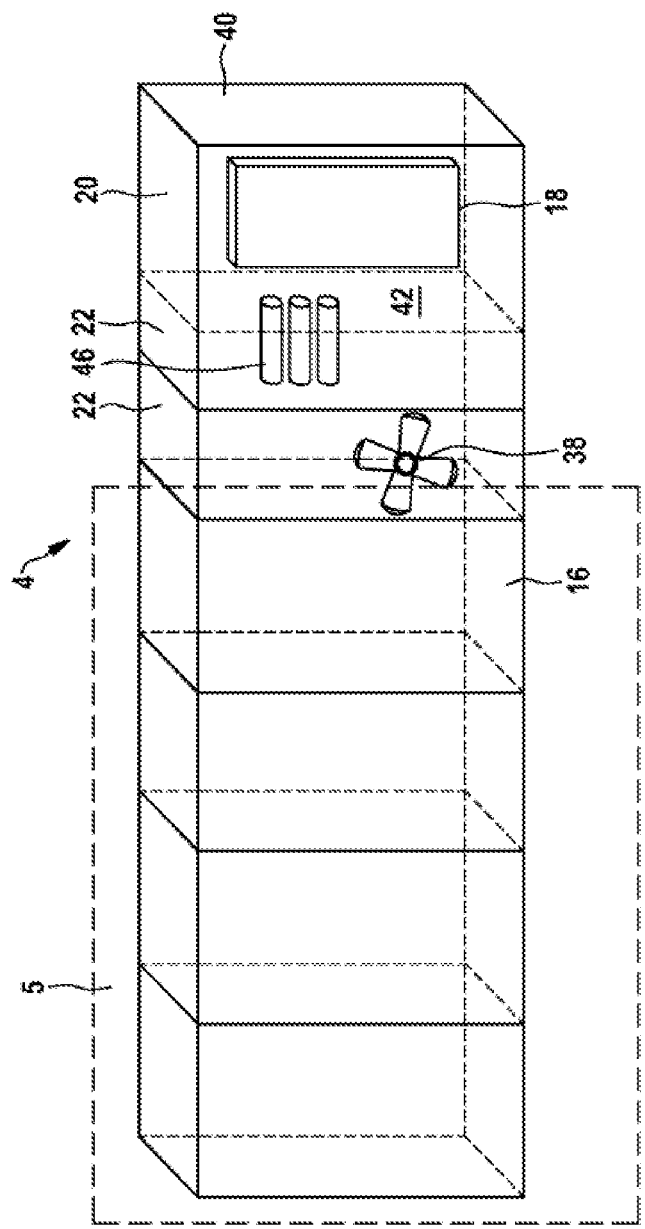
FIG. 8 shows a schematic illustration of a battery module in a fifth embodiment.

FIG. 8 shows a further exemplary embodiment of the battery module 4 according to the disclosure, which comprises four chambers 16 of the first type arranged next to one another, a chamber 20 of the second type having the switching electronics 18 and two chambers 22 of the third type arranged next to one another, wherein the chambers 22 of the third type are not illustrated true to scale in the exemplary embodiment illustrated. The chambers 16 of the first type, the chamber 20 of the second type and the chambers 22 of the third type all together preferably have identical dimensions, as described with reference to FIG. 4. A first chamber 22 of the third type comprises a plurality of heat pipes 46, which pass the waste heat from the switching electronics 18 from the side wall 42 of the chamber 20 of the second type, which adjoins the first chamber 22 of the third type, through the first chamber 22 of the third type and into the second chamber 22 of the third type. The waste heat is dissipated out of the second chamber 22 of the third type by means of the fan 38, wherein the side walls of the chamber 22 of the third type can have corresponding cooling gratings, perforations or ventilation openings.

The disclosure is not restricted to the exemplary embodiments described here and the aspects highlighted therein. Instead, a multiplicity of modifications which are within the scope of the practice of a person skilled in the art are possible within the scope specified by the claims.

The invention claimed is:

1. A battery module, comprising:
   a plurality of chambers of a first type aligned in a first direction;
   a chamber of a second type;
   a plurality of chambers of a third type;
   at least one battery unit positioned in one of the plurality of chambers of the first type; and
   switching electronics positioned in the chamber of the second type,
   wherein at least one chamber of the plurality of chambers of the third type is positioned between a first end chamber of the plurality of chambers of the first type and the chamber of the second type, the at least one chamber of the third type does not include a battery unit or switching electronics positioned therein,
   wherein the at least one chamber of the third type is defined by a plurality of side walls including a first side wall adjacent only to the first end chamber on one side, a second side wall adjacent to the chamber of the second type on an opposite side, and a peripheral wall that extends between the first and second side walls and encloses the at least one chamber of the third type, and
   wherein the peripheral wall defines a periphery of the at least one chamber of the third type that is encompassed by respective peripheries of the chambers of the first type and a periphery of the chamber of the second type when the battery module is viewed in the first direction.

2. The battery module as claimed in claim 1, wherein each of the plurality of chambers of the first type, the chamber of the second type, and each of the plurality of chambers of the third type have identical dimensions.

3. The battery module as claimed in claim 1, wherein at least one chamber of the plurality of chambers of the third type is free.

4. The battery module as claimed in claim 1, further comprising a cooling device positioned in the at least one chamber of the plurality of chambers of the third type.

5. The battery module as claimed in claim 4, wherein an interior of the at least one chamber of the third type is in fluid communication with an interior of the chamber of the second type through the second side wall, the cooling device configured to cool the switching electronics.

6. The battery module as claimed in claim 5, wherein the cooling device comprises a fan.

7. The battery module as claimed in claim 6, further comprising at least one side wall of the chamber of the second type, the at least one side wall being perforated.

8. The battery module as claimed in claim 1, wherein the at least one battery unit comprises a plurality of battery units with each of the plurality of battery units positioned in a respective one of the plurality of chambers of the first type, the switching electronics configured to selectively connect the plurality of battery units.

9. The battery module as claimed in claim 1, wherein the at least one battery unit positioned in one of the plurality of chambers of the first type includes a plurality of cells.

10. A battery direct converter, comprising:
at least one battery module including:
a plurality of chambers of a first type,
a chamber of a second type,
a plurality of chambers of a third type,
a plurality of battery units with each battery unit positioned in a respective one of the plurality of chambers of the first type, and
switching electronics positioned in the chamber of the second type, the switching electronics configured to selectively connect the plurality of battery units,
wherein at least one chamber of the plurality of chambers of the third type is positioned between a first end chamber of the plurality of chambers of the first type and the chamber of the second type, the at least one chamber of the third type does not include a battery unit or switching electronics positioned therein,
wherein the at least one chamber of the third type is defined by a plurality of side walls including a first side wall adjacent only to the first end chamber on one side, a second side wall adjacent to the chamber of the second type on an opposite side, and a peripheral wall that extends between the first and second side walls and encloses the at least one chamber of the third type, and
wherein the peripheral wall defines a periphery of the at least one chamber of the third type that is encompassed by respective peripheries of the chambers of the first type and a periphery of the chamber of the second type when the battery module is viewed in the first direction.

11. A battery direct inverter, comprising:
at least two battery direct converters each including at least one battery module, the at least one battery module including:
a plurality of chambers of a first type,
a chamber of a second type,
a plurality of chambers of a third type,
a plurality of battery units with each battery unit positioned in a respective one of the plurality of chambers of the first type, and
switching electronics positioned in the chamber of the second type, the switching electronics configured to selectively connect the plurality of battery units,
wherein at least one chamber of the plurality of chambers of the third type is positioned between a first end chamber of the plurality of chambers of the first type and the chamber of the second type, the at least one chamber of the third type does not include a battery unit or switching electronics positioned therein,
wherein the at least one chamber of the third type is defined by a plurality of side walls including a first side wall adjacent only to the first end chamber on one side, a second side wall adjacent to the chamber of the second type on an opposite side, and a peripheral wall that extends between the first and second side walls and encloses the at least one chamber of the third type, and
wherein the peripheral wall defines a periphery of the at least one chamber of the third type is encompassed by respective peripheries of the chambers of the first type and a periphery of the chamber of the second type when the battery module is viewed in the first direction.

12. The battery module as claimed in claim 6, further comprising at least one side wall of the chamber of the second type, the at least one side wall having ventilation grating.

13. The battery module as claimed in claim 6, further comprising at least one side wall of the chamber of the second type, the at least one side wall having cooling ribs.

14. The battery module as claimed in claim 1, wherein the at least one chamber of the third type and the chamber of the second type are aligned with the plurality of chambers of the first type in the first direction.

15. The battery module as claimed in claim 5, wherein the cooling device comprises heat pipes.

16. The battery module as claimed in claim 7, wherein the at least one side wall of the chamber of the second type forms a common wall with the second side wall of the at least one chamber of the third type.

* * * * *